United States Patent
Tomita et al.

(10) Patent No.: US 6,971,776 B2
(45) Date of Patent: Dec. 6, 2005

(54) VEHICLE LAMP

(75) Inventors: Kenji Tomita, Shizuoka (JP); Yosiaki Aiso, Shizuoka (JP); Ken Matsuoka, Shizuoka (JP); Katutada Shirai, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/314,950

(22) Filed: Dec. 10, 2002

(65) Prior Publication Data

US 2003/0112636 A1 Jun. 19, 2003

(30) Foreign Application Priority Data

Dec. 13, 2001 (JP) ........................ 2001-380329

(51) Int. Cl.[7] .............................................. F21V 14/04
(52) U.S. Cl. ........................ 362/515; 362/528; 362/421
(58) Field of Search ................................. 362/515, 319, 362/528, 421, 282, 322, 427, 37, 512, 523, 513; 248/181.1, 181.2

(56) References Cited

U.S. PATENT DOCUMENTS

| | | | |
|---|---|---|---|
| 5,678,915 A | * | 10/1997 | Shirai et al. ................. 362/460 |
| 5,917,655 A | | 6/1999 | Lehnen et al. |
| 5,951,157 A | | 9/1999 | Shirai et al. |
| 5,993,033 A | | 11/1999 | Sugimoto et al. |
| 6,210,024 B1 | | 4/2001 | Shida |
| 6,231,220 B1 | * | 5/2001 | Shibuya et al. ............. 362/507 |
| 6,260,993 B1 | | 7/2001 | Ito |

FOREIGN PATENT DOCUMENTS

JP          10-326509          12/1998

\* cited by examiner

Primary Examiner—Thomas M. Sember
Assistant Examiner—Bao Q. Truong
(74) Attorney, Agent, or Firm—Sughrue Mion, PLLC (57) ABSTRACT

A vehicle lamp includes a reflector tiltably supported by an aiming mechanism intervening between the reflector and a lamp body. An aiming fulcrum forming the aiming mechanism is formed with a ball joint including a pivot on the reflector side and a bearing on the lamp body side. The pivot is formed with a shaft portion on the base end side and a ball portion on the front end side. The bearing is formed with a cylindrical ball bearing portion formed on the inner periphery where a ball supporting surface in press-contact with the ball portion opening forward via a ring-like diameter reducing portion. Vertical slits are provided in the open peripheral edge portion of the ball bearing portion. The ball portion is formed into a substantially hemispheric ball portion such that its front side press-fitted into the ball bearing portion has a spherical surface.

5 Claims, 8 Drawing Sheets

VEHICLE LAMP

BACKGROUND OF THE INVENTION

1. Field of the Invention

The present invention relates to a lamp, such as an automotive headlamp, having a movable reflector mounted with a light source and supported by an aiming mechanism tiltably with respect to a lamp body. More particularly, the present invention relates to a lamp wherein the aiming mechanism includes a ball joint, and wherein the ball portion of the ball joint is formed into a substantially hemispheric ball portion to provide improved insertion and extraction press-fitting characteristics with respect to the bearing of the ball joint.

2. Description of the Related Art

Figure 10:
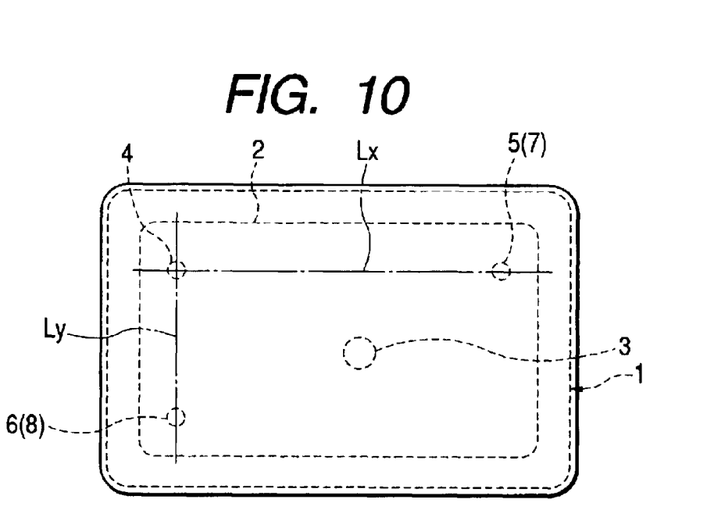
FIG. 10 is an elevational view of a related art headlamp.

In the related art, vehicle lamps include a plastic reflector 2 incorporating a light source 3 as shown in FIG. 10. The plastic reflector 2 is supported by an aiming mechanism on the front side of a plastic lamp body 1. The aiming mechanism includes a ball joint 4 as one aiming fulcrum and two nut members 7 and 8 as moving fulcrums capable of moving back and forth. The two nut members 7 and 8 are screwed on two aiming screws 5 and 6, respectively.

More specifically, the aiming screw 5 (6) is rotatably and removably supported with a screw passing hole provided in the lamp body 1, and the plastic nut member 7 (8) attached to a bracket formed in an extended condition on the back side of the reflector 2 is screwed on the aiming screw 5 (6) extended forward from the lamp body 1. The nut member 7 (8) is moved back and forth along the aiming screw 5(6) by rotating the aiming screw 5 (6) and the reflector 2 is moved as to tilt around an oblique axis Ly (Lx) connecting the ball joint 4 and the other aiming screw 6 (5) on which the nut member 8 (7) is screwed, whereby the optical axis of the lamp is made adjustable.

Figure 11A:
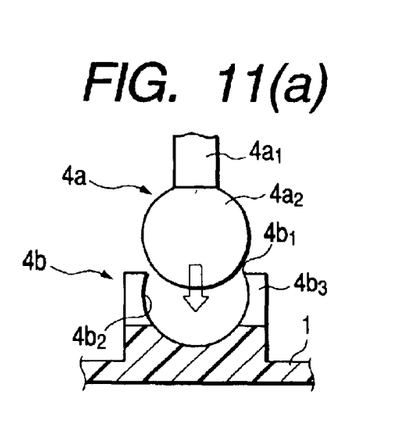
FIGS. 11(a) and 11(b) are sectional views of the situation in which the ball portion of the ball joint forming the aiming fulcrum is press-fitted into the ball bearing portion.
Figure 11B:
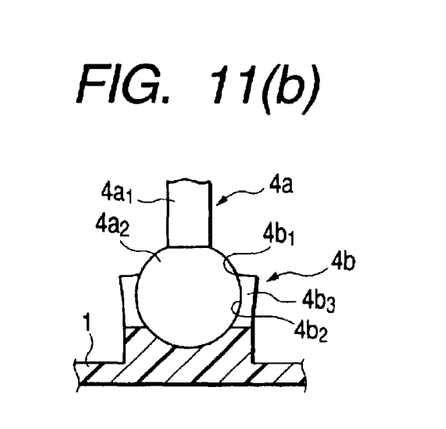

As shown in FIGS. 11(*a*) and (*b*), the ball joint 4 forming the aiming fulcrum includes a pivot 4*a* mounted on the reflector 2 and a bearing 4*b* provided on the lamp body 1. The pivot 4*a* includes a base-end-side shaft portion 4*a*1 secured to the reflector 2 and a ball portion 4*a*2 on the front side. The bearing 4*b* is formed with a cylindrical ball bearing portion formed on the inner periphery of a ball supporting surface 4*b*2 in alignment with the ball portion 4*a*2 opening forward via a diameter reducing portion 4*b*1. Further, a plurality of vertical slits 4*b*3 are provided in the open peripheral edge portion of the ball bearing portion 4*b*. The ball bearing portion 4*b* is divided into a plurality of divided pieces in the peripheral direction and the ball joint 4 is formed by press-fitting the ball portion 4*a*2 of the pivot 4*a* into the bearing (ball bearing portion) 4*b*.

Figure 9:
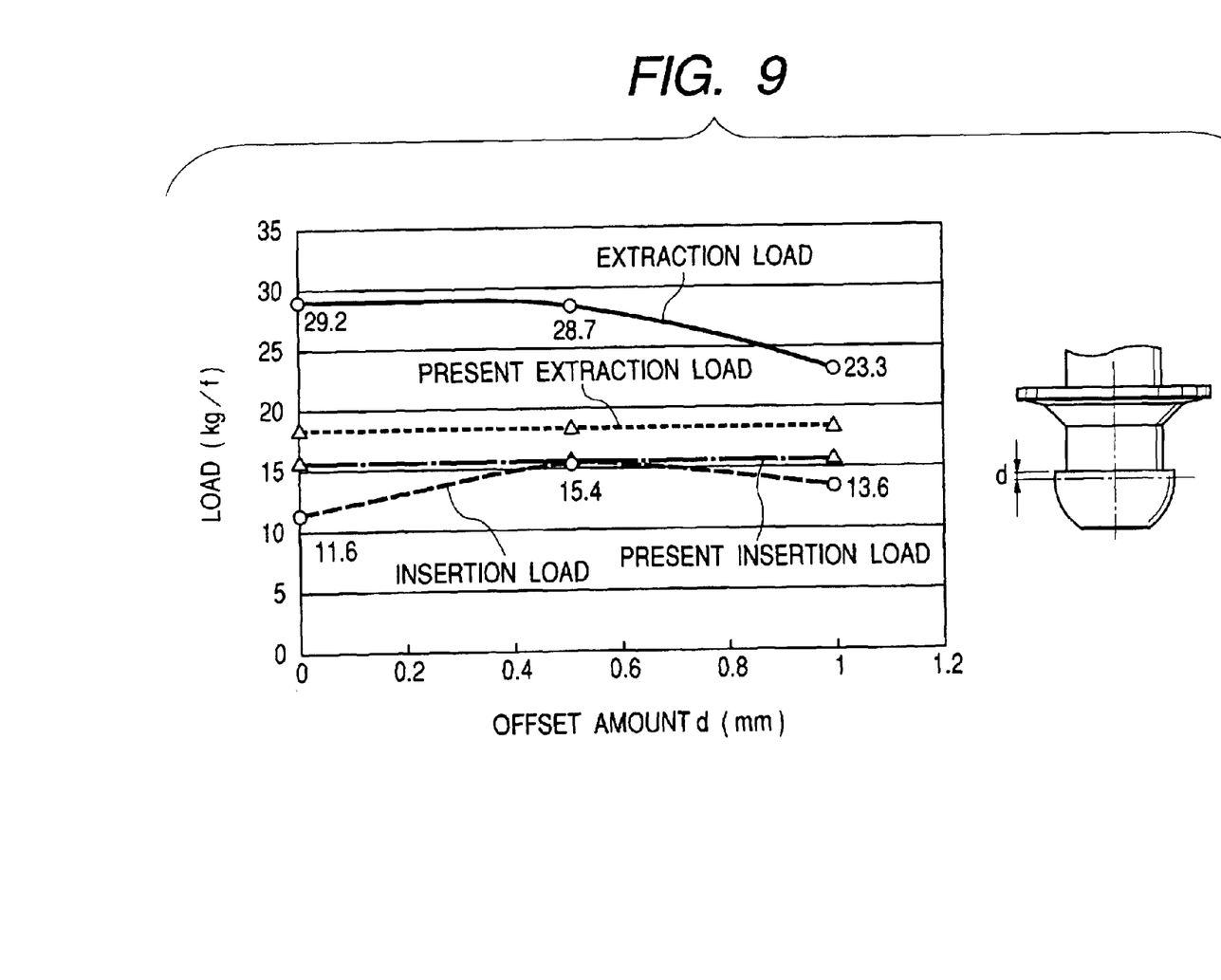
FIG. 9 is a diagram showing the relation between an offset amount in the axial direction of the peripheral edge of a hemispheric ball portion forming the ball joint and insertion/extraction loads according to this embodiment of the invention.
Figure 12:
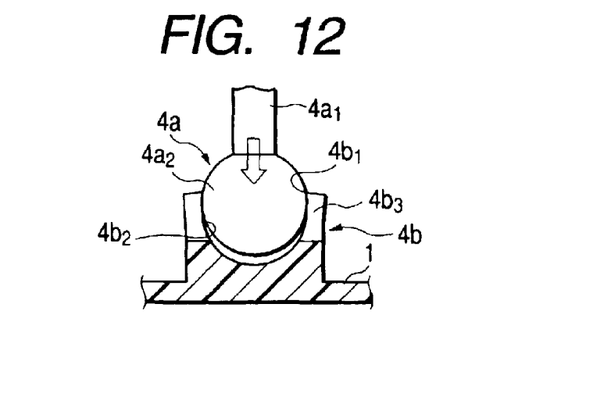
FIG. 12 is a sectional view illustrating the force generated when the ball portion of the ball joint is press-fitted into the ball bearing portion.

However, one problem with the related art headlamp described above is that, as shown in FIG. 12, great force (approximately 18–19 kg/f as shown in FIG. 9) of press-fitting the ball portion 4*a*2 is required because the whole ball portion 4*a*2 has to be squeezed in by making it climb over the diameter reducing portion 4*b*1. In other words, even though the largest diameter area of the ball portion 4*a*2 positionally climbs over the diameter reducing portion 4*b*1, an area near the largest diameter of the ball portion 4*a*2 forces the diameter reducing portion 4*b*1 slightly open, which makes it necessary to squeeze the ball portion 4*a*2 in while the diameter reducing portion 4*b*1 is being forced open to its fullest extent for a short time, so that great push-down force is needed to act on the ball portion 4*a*2.

When a vibration or a shock act on the reflector 2 through a vehicle body, for example, there develops another problem in that although inertia force acting on the reflector 2 is not so great, the spherical ball portion 4*a*2 comes to deviate from the ball bearing portion 4*b*. In other words, as the spherical ball portion 4*a*2 forces the diameter reducing portion 4*b*1 slightly open, gradually in the case where the ball portion 4*a*2 thus deviates, resistance force on the part of the ball bearing portion 4*b* acting on the ball portion 4*a*2 is relatively weak, whereby the ball portion 4*a*2 may be extracted with little force.

SUMMARY OF THE INVENTION

Therefore, the present inventor has made a ball joint by taking into consideration use of a hemispheric ball portion 4*a*2 of the pivot with only its press-fitting side rendered to be spherical in order to solve the foregoing problems. Because of this, it was confirmed that the force required to press-fit the ball portion was smaller than what had been required to press-fit the related art ball portion. It was also confirmed that great force was required in order for the hemispheric ball portion to be dislodged once it has been assembled. As a result, the present invention has been proposed.

An object of the invention made in view of the foregoing problems inherent in the related art described above is to provide a vehicle lamp having a ball joint such that its ball portion is difficult to slip off a ball bearing portion but easily press-fitted into the ball bearing portion.

In order to accomplish the above object, a vehicle lamp in a first aspect of the invention comprises:

a lamp body;

a reflector; and an aiming mechanism at least partially disposed between the reflector and the lamp body, wherein the reflector is tiltably supported by the aiming mechanism with respect to the lamp body, the aiming mechanism including an aiming fulcrum having a ball joint including a pivot on a reflector side and a bearing on a lamp body side of the ball joint, the pivot having a shaft portion on a base end side and a ball portion on a front end side of the pivot, the bearing including a cylindrical ball bearing portion formed on an inner periphery and opening forward via a diameter reducing portion, the ball bearing portion having a ball supporting surface in press-contact with the ball portion, the bearing further including one or more vertical slits in an open peripheral edge portion that support press-fitting of the ball portion into the ball bearing portion, and wherein, the ball portion is formed into a substantially hemispheric ball portion such that a front side of the ball portion press-fitted into the ball bearing portion has a spherical surface of a ball having a diameter of D.

(Function) In the related art, when the ball portion is press-fitted into the ball bearing portion, it is necessary to push the ball portion in while an attempt is made to push the diameter reducing portion as wide as possible for the time being because an area near the largest diameter area of the ball portion forces the diameter reducing portion slightly open even though the largest diameter area of the diameter reducing portion positionally climbs over the diameter reducing portion. Consequently, great push-down force must be applied to the ball portion to that extent. On the other hand, in the present invention, since the ball portion is hemispherical with its press-fitting side being the spherical surface according to the invention, the action of pushing slightly open the diameter reducing portion of the ball portion vanishes at a stroke as soon as the largest diameter area of the ball portion climbs over the diameter reducing portion. As the righting moment of the side wall of the ball bearing portion positively works to press-fit the ball portion accordingly, only small push-down force is necessary to press-fit the ball portion.

Further, in the related art, when the ball portion is pulled out of the ball bearing portion, the ball portion acts as what slowly pushes the diameter reducing portion slightly open and ball-bearing-side resistance force acting on the ball portion is relatively small as the spherical surface of the ball portion slowly pushes the diameter reducing portion so that the ball portion detaches with a proportionally small force. According to the invention, on the other hand, as the peripheral edge portion of the ball portion as the largest diameter area is required to push the diameter reducing portion slightly open at a stroke, the ball-bearing-side resistance force acting on the ball portion is great and proportionally, great force is necessary to detach the ball portion. As a result, the ball portion is difficult to detach.

In a second aspect of the invention, the vehicle lamp according to the first aspect of the invention is arranged so that the ball portion is formed with the spherical surface formed up to the position offset by D/10 at its maximum toward the shaft portion of the pivot from the center of the ball having a diameter of D and forming the spherical surface on a front side of the ball portion.

(Function) The offset amount $\underline{d}$ of the peripheral edge portion of the ball portion toward the shaft portion is preferably set within the range of 0–D/10 toward the shaft portion from the center O of the ball (having the diameter D) forming the spherical surface of the ball portion from the data shown in FIG. 9. More specifically, the offset amount $\underline{d}$ is preferably D/10 or smaller as the insertion load becomes greater whereas the separation load becomes smaller when the offset amount $\underline{d}$ exceeds D/10, which loads are close to the insertion and separation loads of the related art ball joint. Moreover, the pivot is generally formed of an injection-molded synthetic resin material and in consideration of a production tolerance, the offset amount $\underline{d}$ should preferably not be 0, but have a positive value.

In a third aspect of the invention, the vehicle lamp of the first or second aspects of the invention may be arranged so that a tapered face for introducing the ball portion, whose diameter expands forward, is formed in the open peripheral edge portion and ranges to the ball supporting surface via the ring-like diameter reducing portion.

(Function) The tapered face is used to guide the ball portion to the diameter reducing portion and to efficiently transmit the push-down force in the direction in which the ball bearing portion is forced slightly open. As such, the tapered face acts as what works to push the diameter reducing portion slightly open smoothly.

DETAILED DESCRIPTION OF THE PREFERRED EMBODIMENTS

An embodiment of the invention will now be described with reference to the drawings. FIGS. 1–9 show a first embodiment of the invention.

In these drawings, reference numeral 10 denotes a vessel-like plastic lamp body in which a plastic reflector 12 with a bulb 14 as a light source attached to the reflector 12 by insertion is disposed, and a front lens 16 is incorporated into the front opening of the lamp body 10.

The reflector 12 is vertically-laterally tiltably supported by an aiming mechanism including a pair of aiming screws 20 and 30 respectively passing screw-passing holes 10b formed in the back wall of the lamp body 10 and extending horizontally in the longitudinal direction. Nut members 26 and 36 are screwed onto the aiming screws 20 and 30 in conjunction with brackets 55 and 56 projected from the back of the reflector 12. Ball joint 40 is disposed between the reflector 12 and the lamp body 10.

The ball joint 40 includes a plastic, and preferably an engineering plastic pivot 42, and a bearing (ball bearing portion) 46 projected from the lamp body 12. Engineering plastic, at least for the plastic pivot, is sometimes preferable in consideration of its slidability characteristics. As noted above, the aiming screws 20 and 30 are pivotably and removably supported in the respective screw passing holes 10b of the lamp body 10, and the nut members 26 and 36 are screwed respectively onto screw portions 20a and 30a extending forward. Pivotally moving portions 21 and 31 formed with mating grooves 21a and 31a with which the threaded portion of a driver D mates are formed in the rear end portions of the screws projecting backward from the lamp body 10, respectively.

When the driver D is used to turn the pivotally moving portions 21 and 31 (aiming screws 20 and 30), the nut members 26 and 36 are moved back and forth along the respective screw portions 20a and 30a, whereby the reflector 12 (optical axis of the lamp) is tilted vertically and laterally. In other words, the aiming screw 20 forms a vertical aiming screw for tilting (tilting vertically) the reflector 12 around a horizontal axis Lx connecting the nut member 36 and the ball joint 40, whereas the aiming screw 30 forms a lateral aiming screw for tilting (tilting laterally) the reflector 12 around a vertical axis Ly connecting the nut member 26 and the ball joint 40.

Figure 1:
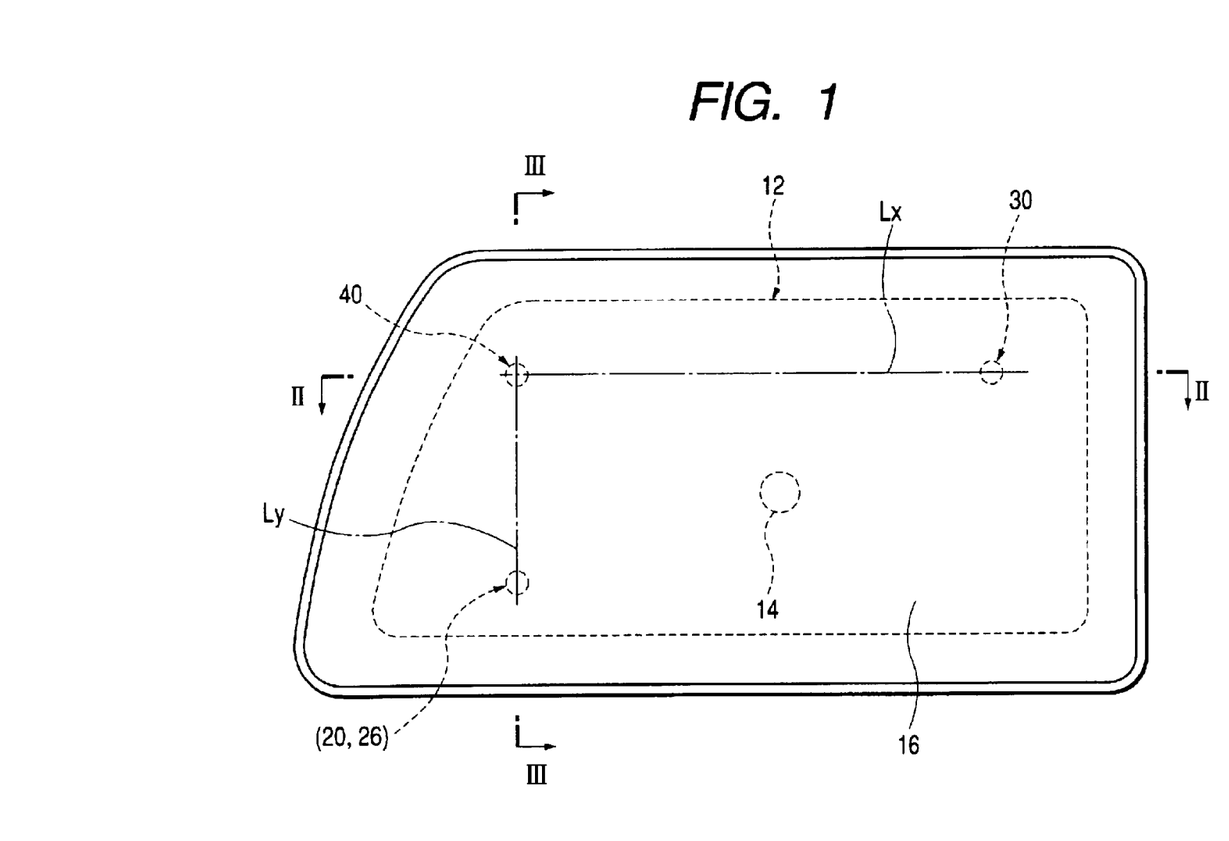
FIG. 1 is an elevational view of an automotive headlamp according to a first embodiment of the invention.
Figure 2:
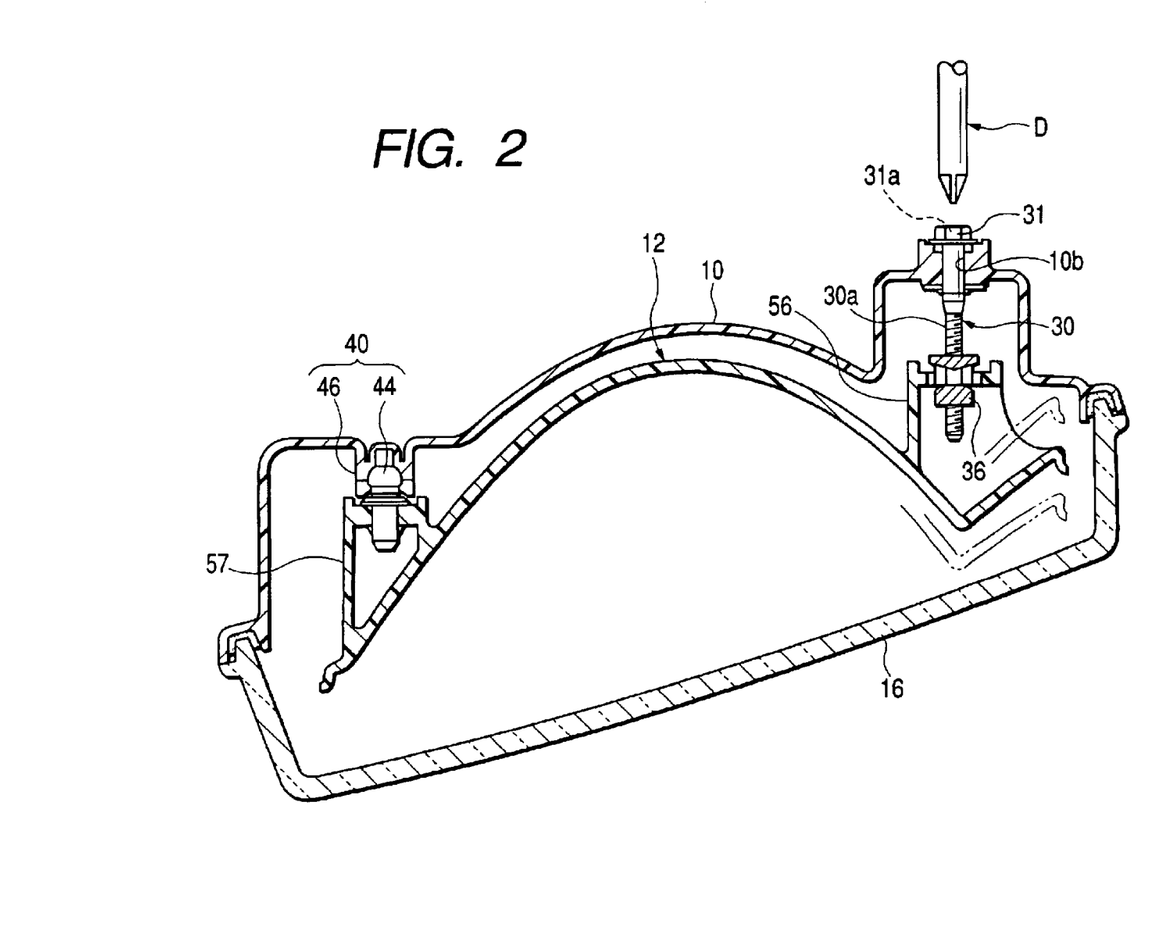
FIG. 2 is a horizontal sectional view (sectional view taken on line II—II of FIG. 1) of the headlamp.
Figure 3:
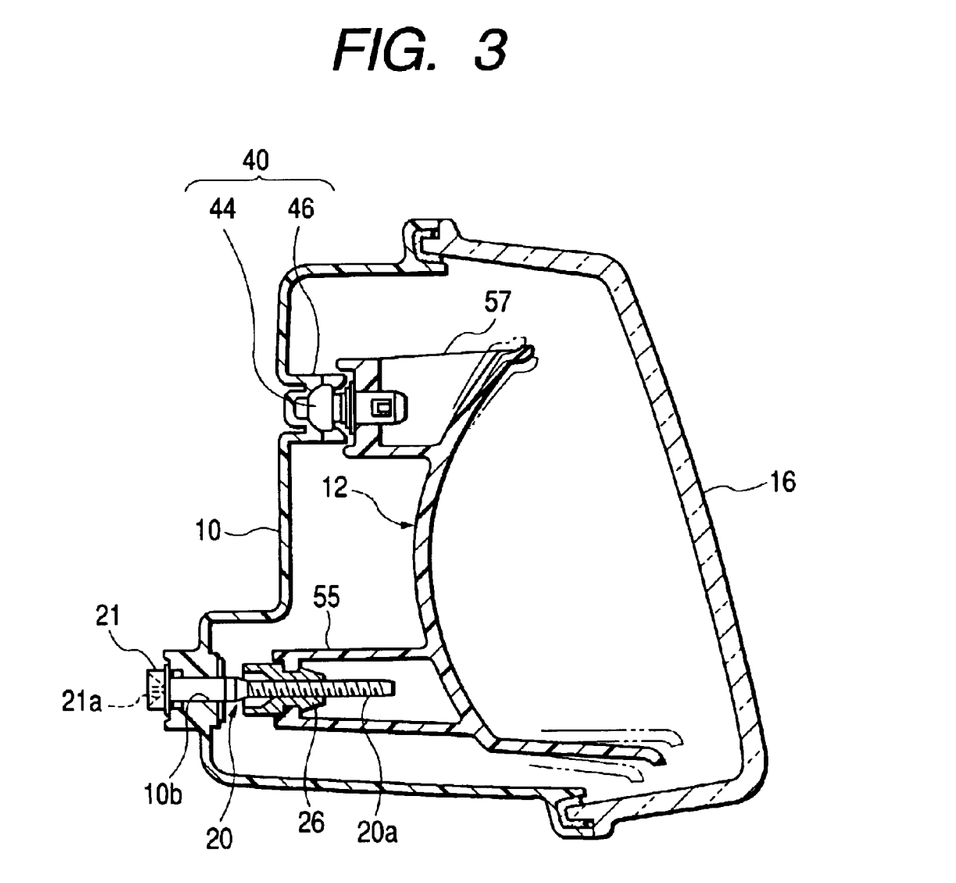
FIG. 3 is a vertical sectional view (sectional view taken on line III—III of FIG. 1) of the headlamp.
Figure 4A:
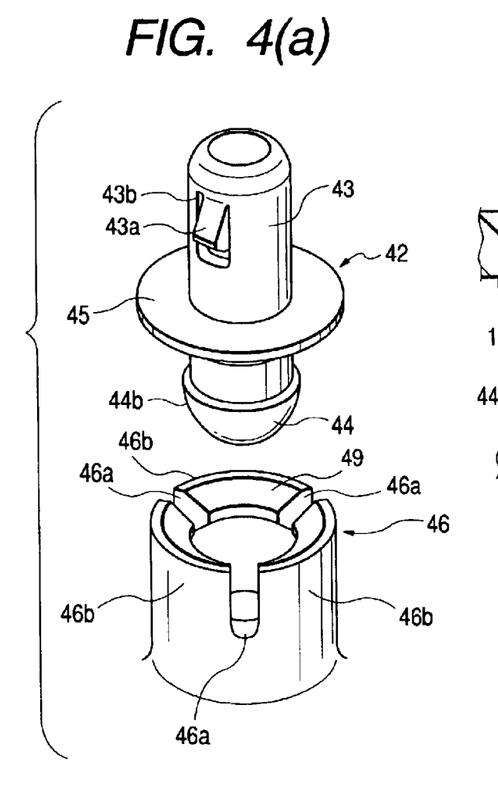
FIG. 4(a) is an exploded perspective view of a ball joint as the aiming fulcrum of the headlamp.
Figure 4B:
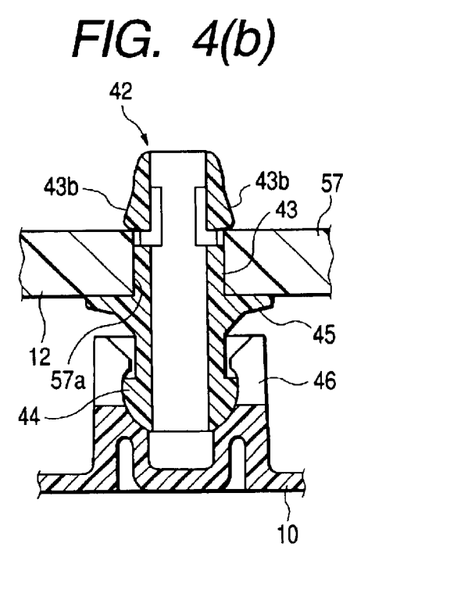
FIG. 4(b) is a sectional view of the ball joint.
Figure 5A:
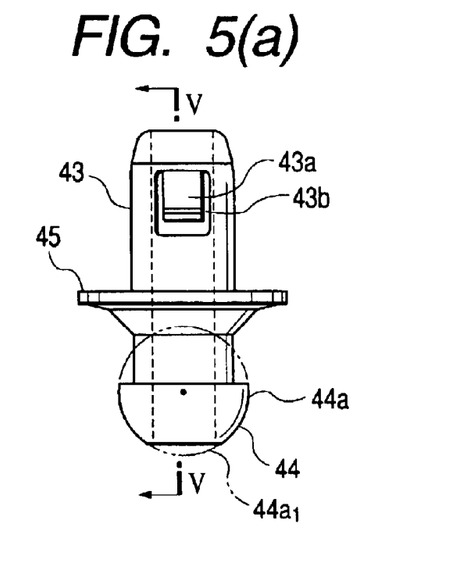
FIG. 5(a) is a side view of a pivot.
Figure 5B:
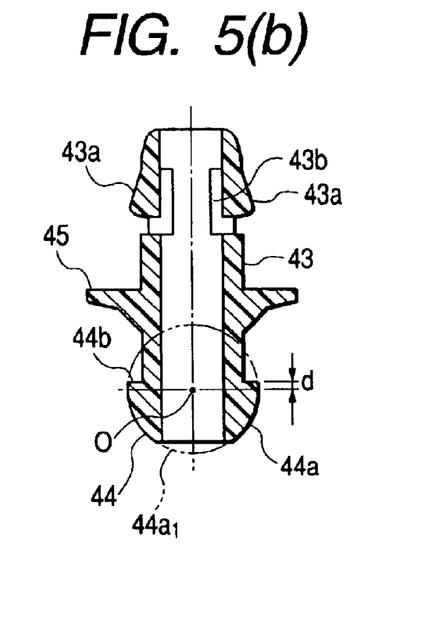
FIG. 5(b) is a sectional view of the pivot (sectional view taken on line V—V of FIG. 5(a))

As shown in FIGS. 4 and 5, further, the pivot 42 is formed into a cylindrical shape opening longitudinally in the axial direction. A shaft portion 43, having a pair of tongue-like latch pawls 43a and 43a, is provided on the base end side of the pivot 42 fixed to the reflector 12 and a substantially hemispheric ball portion 44 is provided on the front end side press-fitted into the bearing (ball bearing portion) 46. Moreover, a skirt-like flange portion 45 is provided around the shaft portion 43 separately from the ball portion 44. Reference numeral 43b denotes a slit.

The front end side of the latch pawl 43a provided opposite to the side wall of the shaft portion 43, the front end side thereof giving seesaw motion, is projected from the outer peripheral face of the shaft portion 43 and when the shaft portion 43 is inserted into the pivot inserting hole 57a of a bracket 57 (see FIG. 4(b)), the peripheral edge portion of the pivot inserting hole 57a is clamped between the flange portion 45 and the latch pawls 43a, so that the pivot 42 is fixed to the bracket 57.

As shown in FIG. 5, the ball portion 44 is formed into a substantially hemispheric shape with its side to be inserted into the bearing (ball bearing portion ) 46 as a spherical surface 44a having a diameter of D (D=10 mm according to this embodiment of the invention) ranging to the slender shaft portion 43. Further, the peripheral edge portion 44b of the ball portion 44 which will be described in detail later is formed in the position offset by D/10 at its maximum toward the shaft portion 43 from the center O of a ball 44a1 forming the spherical surface 44a in consideration of facilitating the press-fitting of the spherical surface 44a into the bearing (ball bearing portion) 46, and difficulty in extracting the ball portion 44 therefrom. In other words, the ball portion 44 is formed into a substantially hemispheric shape with the removal of the spherical portion on the shaft portion 43 by cutting the ball 44a1 in a direction perpendicular to the axial direction in the position offset by a predetermined distance of d (O≧d≧D/10) toward the shaft portion 43 from the center O of the ball 44a1.

Figure 6:
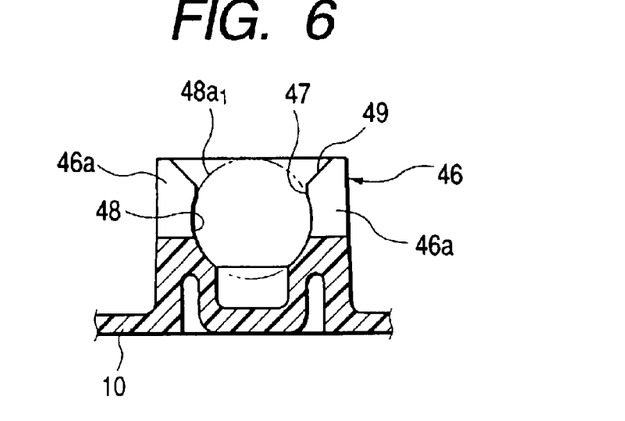
FIG. 6 is a sectional view of a bearing (ball bearing portion) forming the ball joint.

In addition, the bearing (ball bearing portion) 46 is, as shown in FIG. 6, formed into a substantially cylindrical shape opening forward via a diameter reducing portion 47 and has an outer diameter of 19.7 mm and also a vertical slit 46a in three places equally apart from each other in the circumferential direction of the peripheral edge portion of the opening of the ball bearing portion 46. The peripheral wall of the ball bearing portion 46 is formed with three divided pieces 46b capable of elastic deformation in the radial direction.

A ball supporting surface 48 in press-contact with (the spherical surface 44a of) the ball portion 44 of the pivot 42 is formed on the inner periphery of the bearing (ball bearing portion) 46 and may include a tapered face 49 for introducing the ball portion whose diameter expands forward via the diameter reducing portion 47. In this embodiment, the ball supporting surface 48 is formed with the spherical surface of the ball 48a1 having a diameter of 9.8 mm which is slightly smaller than the spherical surface 44a (spherical surface of a ball having a diameter of D=10 mm) of the ball portion 44 so that the ball portion 44 can be supported with the ball portion 44 adhering to the spherical surface 44a of the ball portion 44, thus press-fitted in.

Moreover, the tapered face 49 is tilted 45° in the axial direction and when the ball portion 44 is press-fitted into the bearing (ball bearing portion) 46, the tapered face 49 functions as to smoothly guide the ball portion 44 to the diameter reducing portion 47. When the ball portion 44 is extracted from the bearing (ball bearing portion) 46, the tapered face 49 functions as to smoothly separate out the ball portion 44 extracted from the diameter reducing portion 47 by thrusting up the ball portion 44.

Figure 7:
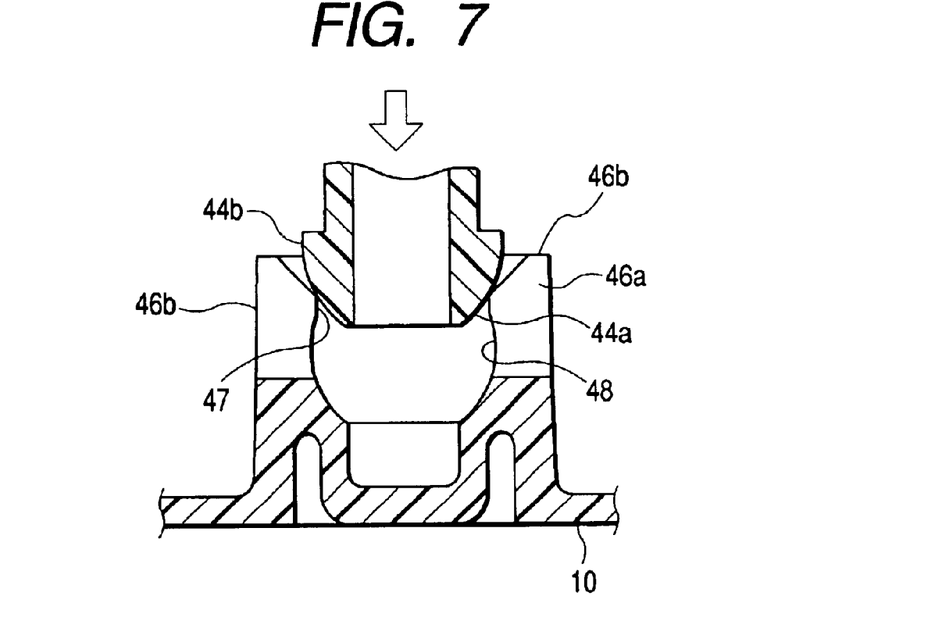
FIG. 7 is a diagram explanatory of force acting on a ball portion when the ball portion is attached and detached.
Figure 8:
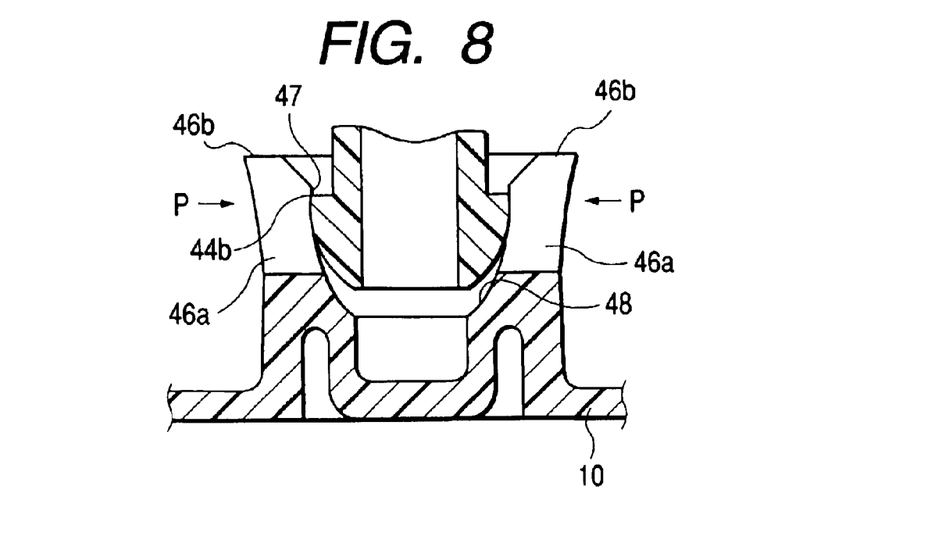
FIG. 8 is a diagram explanatory of force acting on a bearing (ball bearing portion) when the ball portion is attached and detached.

In the related art, when the ball portion is press-fitted into the ball bearing portion, it is necessary to push the ball portion in while an attempt is made to push the diameter reducing portion as wide as possible for the time being because the area near the largest diameter area of the ball portion forces the diameter reducing portion slightly open even though the largest diameter area of the diameter reducing portion positionally climbs over the diameter reducing portion. Consequently, great push-down force must be applied to the ball portion to that extent (the insertion load is great). On the other hand, in the present invention, since the ball portion 44 is hemispherical with its press-fitting side being the spherical surface 44a according to this embodiment of the invention, the action of pushing slightly open the diameter reducing portion 47 of the ball portion 44 vanishes as soon as the peripheral edge portion 44b as the largest diameter area of the ball portion 44 climbs over the diameter reducing portion 47. As the righting moment P of the side wall (divided pieces 46b) of the ball bearing portion 46 positively works to press-fit the ball portion 44, accordingly, only small push-down force is necessary to press-fit the ball portion 44 as shown in FIGS. 7 and 8. In other words, after the peripheral edge portion 44b of the ball portion 44 climbs over the diameter reducing portion 47, the ball portion 44 readily fits into the ball bearing portion 46 with a snap.

The force (insertion load) required to press-fit the ball portion 44 into the bearing (ball bearing portion) 46 is as shown in FIG. 9 and is as small as approximately 15 kg/f according to this embodiment of the invention. Of note is that this force is smaller than the 18–19 kg/f that is required in the related art bearing configurations.

In the related art, when the ball portion is conversely pulled out of the bearing (ball bearing portion), the spherical surface of the ball portion of the ball joint slowly pushes the diameter reducing portion slightly open and resistance force acting on the ball portion is relatively small. As such, the ball portion can easily slip out of the bearing. According to this embodiment of the invention, however, as the peripheral edge portion 44b of the ball portion 44 as the largest diameter area is required to push the diameter reducing portion 47 slightly open at a stroke, the counterforce (resistance force) acting on the ball portion 44 from the ball bearing portion 46 (divided pieces 46b) is great. As shown in FIG. 9, the separation load applied to the ball portion reaches as great as approximately 25–30 kg/f in comparison with a related art obtained value of approximately 15 kg/f. Therefore, this indicates that the ball portion of the present invention is difficult to detach.

The offset amount $\underline{d}$ of the peripheral edge portion 44b of the ball portion 44 toward the shaft portion 43 is preferably set within the range of 0–D/10 toward the shaft portion 43 from the center O of the ball 44a1 (having the diameter D) forming the spherical surface 44a of the is ball portion 44 from the data shown in FIG. 9. More specifically, the offset amount $\underline{d}$ is preferably D/10 or smaller as the insertion load becomes greater, whereas the separation load becomes smaller when the offset amount $\underline{d}$ exceeds D/10, which loads are close to the insertion and separation loads of the related art ball joint. Moreover, the pivot is generally formed of an injection-molded synthetic resin material and in consideration of a production tolerance, the offset amount $\underline{d}$ should preferably not be 0, but have a positive value.

Although a description has been given of the use of the present invention in an automotive headlamp, the invention is applicable not solely to such a headlamp, but also other applications, for example, those employing aiming mechanisms, ball joints, bearings, etc.

As is obvious from the description given above, according to the invention, the ball joint is easily incorporated and the reflector is simply mounted in the lamp to the extent that the force required to press-fit the ball portion into the ball bearing portion is reduced. Moreover, the durability of the aiming fulcrum increases to the extent that the ball portion of the ball joint is difficult to slip off and this ensures that the aiming mechanism is usable over a long period of time.

What is claimed is:

1. A vehicle lamp comprising:

a lamp body;

a reflector; and an aiming mechanism at least partially disposed between the reflector and the lamp body, wherein the reflector is tiltably supported by the aiming mechanism with respect to the lamp body, the aiming mechanism including an aiming fulcrum having a ball joint including a pivot on a reflector side and a bearing on a lamp body side of the ball joint, the pivot having a shaft portion on a base end side and a ball portion on a front end side of the pivot, the bearing including a cylindrical ball bearing portion formed on an inner periphery and opening forward via a diameter reducing portion, the ball bearing portion having a ball supporting surface in press-contact with the ball portion, the bearing further including one or more vertical slits in an open peripheral edge portion that support press-fitting of the ball portion into the ball bearing portion, and wherein, the ball portion is formed into a substantially hemispheric ball portion such that a front side of the ball portion press-fitted into the ball bearing portion has a spherical surface of a ball having a diameter of D.

2. The vehicle lamp as claimed in claim 1, wherein the ball portion is formed with the spherical surface at a position offset by no more than D/10 toward the shaft portion of the pivot from the center of the ball having a diameter of D and forming the spherical surface on a front side of the ball portion.

3. The vehicle lamp as claimed in claim 1, wherein a tapered face for introducing the ball portion is formed in the open peripheral edge portion and ranges to the ball supporting surface via the diameter reducing portion.

4. A vehicle lamp comprising:

a lamp body;

a reflector; and an aiming mechanism at least partially disposed between the reflector and the lamp body, wherein the reflector is tiltably supported by the aiming mechanism with respect to the lamp body, and the aiming mechanism includes an aiming fulcrum having a ball joint;

wherein the ball joint includes a ball portion consisting of a substantially hemispheric ball portion, wherein the ball joint includes a pivot having a shaft portion, wherein the ball portion is provided on the pivot, wherein the shaft portion is provided on a base end side of the pivot, the ball portion is provided on a front end side of the pivot, the front end is positioned on the opposite side of the base end in an axial direction of the shaft portion, and wherein the ball portion is formed with the spherical surface at a position offset by no more than D/10 toward the shaft portion of the pivot from the center of a ball having a diameter of D and forming the spherical surface on a front side of the ball portion.

5. The vehicle lamp as claimed in claim 1, wherein the front end is positioned on the opposite side of the base end in an axial direction of the shaft portion.

* * * * *